United States Patent
Zifferer et al.

(10) Patent No.: US 7,694,402 B2
(45) Date of Patent: Apr. 13, 2010

(54) METHOD FOR FORMING A LINED CONDUIT

(75) Inventors: L. Robert Zifferer, Waco, TX (US); Edward A. Reed, Waco, TX (US)

(73) Assignee: Packless Metal Hose, Inc., Waco, TX (US)

( * ) Notice: Subject to any disclaimer, the term of this patent is extended or adjusted under 35 U.S.C. 154(b) by 1180 days.

(21) Appl. No.: 11/194,915

(22) Filed: Aug. 1, 2005

(65) Prior Publication Data
US 2007/0022800 A1    Feb. 1, 2007

(51) Int. Cl.
*B23P 11/00*    (2006.01)
*B23P 11/02*    (2006.01)
*B21D 26/02*    (2006.01)
*B21D 15/03*    (2006.01)

(52) U.S. Cl. .............. 29/421.1; 29/507; 72/56; 72/59; 72/370.07; 72/370.19; 72/370.22

(58) Field of Classification Search ........... 29/421.1, 29/507; 72/56, 58, 59, 370.06, 370.07, 370.19, 72/370.2, 370.21, 370.22; 138/98, 112, 173; 156/287

See application file for complete search history.

(56) References Cited

U.S. PATENT DOCUMENTS

| 629,245 | A | 7/1899 | Frank |
|---|---|---|---|
| 1,777,728 | A | 10/1930 | Kumpf |
| RE18,272 | E | 12/1931 | Frahm et al. |
| 1,951,063 | A | 3/1934 | Reimann et al. |
| 2,110,965 | A | 3/1938 | Singer |
| 2,205,893 | A | 6/1940 | Unger |
| 2,207,245 | A | 7/1940 | Dvorak |
| 2,342,117 | A | 2/1944 | Brown, Jr. et al. |
| 2,365,688 | A | 12/1944 | Dewey |

(Continued)

FOREIGN PATENT DOCUMENTS

JP    58-159974    9/1983

OTHER PUBLICATIONS

PCT "International Search Report and Written Opinion" for International Application No. PCT/US06/29983, mailed Jul. 7, 2008.

(Continued)

*Primary Examiner*—Jermie E Cozart
(74) *Attorney, Agent, or Firm*—Meyertons, Hood, Kivlin, Kowert & Goetzel, P.C.; Eric B. Meyertons

(57) ABSTRACT

A lined conduit formed by decorrugating a corrugated liner conduit inside a first conduit is described. A method and apparatus for forming the lined conduit are also described. The corrugated liner conduit may be positioned inside the first conduit. Each end portion of the corrugated liner conduit may be coupled to a hydraulic expander. Each hydraulic expander may include a hydraulic cylinder. Each hydraulic cylinder may include a piston rod with an opening along the length of the piston rod. The corrugated liner conduit may be evacuated through a valve assembly coupled to the passageway in one of the piston rods. The evacuated corrugated liner conduit may be pressurized with fluid from a fluid source coupled to the valve assembly. Pressurizing the corrugated liner conduit may expand corrugations in the corrugated liner conduit to form a decorrugated liner in the first conduit.

28 Claims, 13 Drawing Sheets

U.S. PATENT DOCUMENTS

| | | | |
|---|---|---|---|
| 2,378,729 | A | 6/1945 | Schmidt |
| 2,499,901 | A | 3/1950 | Brown, Jr. |
| 2,797,554 | A | 7/1957 | Donovan |
| 2,982,360 | A | 5/1961 | Morton et al. |
| 3,191,680 | A | 6/1965 | Vincent |
| 3,946,584 | A | 3/1976 | Yamasaki et al. |
| 4,162,702 | A | 7/1979 | Andersson |
| 4,377,083 | A | 3/1983 | Shepherd et al. |
| 4,383,429 | A | 5/1983 | Ceccacci |
| 4,514,997 | A | 5/1985 | Zifferer |
| 4,865,127 | A | 9/1989 | Koster |
| 5,016,806 | A | 5/1991 | Yapp et al. |
| 5,251,693 | A | 10/1993 | Zifferer |
| 5,311,661 | A | 5/1994 | Zifferer |
| 5,390,742 | A | 2/1995 | Dines et al. |
| 5,419,171 | A | 5/1995 | Bumgarner |
| 5,810,053 | A | 9/1998 | Mandich |
| 6,354,373 | B1 | 3/2002 | Vercaemer et al. |
| 6,523,574 | B1 | 2/2003 | Taylor |
| 6,644,356 | B1 * | 11/2003 | Connor et al. ................ 138/98 |
| 6,722,451 | B2 | 4/2004 | Saugier |
| 6,749,026 | B2 | 6/2004 | Smith et al. |
| 6,799,632 | B2 | 10/2004 | Hall et al. |
| 6,857,451 | B1 * | 2/2005 | Connor et al. ................ 138/98 |
| 6,923,035 | B2 | 8/2005 | Zifferer et al. |
| 2002/0117226 | A1 | 8/2002 | Malcarne |
| 2006/0021210 | A1 | 2/2006 | Zifferer et al. |

OTHER PUBLICATIONS

US Patent and Trademark Office "Office Communication" for U.S. Appl. No. 11/194,917, mailed May 1, 2006; available in PAIR.

US Patent and Trademark Office "Office Communication" for U.S. Appl. No. 11/194,917, mailed Jan. 8, 2007; available in PAIR.

US Patent and Trademark Office "Office Communication" for U.S. Appl. No. 11/194,917, mailed Jul. 25, 2007; available in PAIR.

US Patent and Trademark Office "Office Communication" for U.S. Appl. No. 11/194,917, mailed Jul. 14, 2008; available in PAIR.

US Patent and Trademark Office "Office Communication" for U.S. Appl. No. 11/194,917, mailed Apr. 16, 2008; available in PAIR.

US Patent and Trademark Office "Office Communication" for U.S. Appl. No. 11/194,917, mailed May 13, 2008; available in PAIR.

US Patent and Trademark Office "Office Communication" for U.S. Appl. No. 11/194,917, mailed Jul. 9, 2008; available in PAIR.

International Preliminary Examination Report for International Application No. PCT/US2004/022113; mailed Jan. 16, 2007; 5 pages.

PCT Written Opinion for International Application No. No. PCT/US2004/022113; mailed Sep. 27, 2005; 4 pages.

PCT International Search Report for International Application No. No. PCT/US2004/022113; mailed Sep. 27, 2005; 1 page.

PCT "International Preliminary Examination Report" for International Application No. PCT/US06/29983, mailed Mar. 30, 2009.

US Patent and Trademark Office "Office Communication" for U.S. Appl. No. 11/194,917, mailed Oct. 15, 2009; available in PAIR.

Co-pending U.S. Appl. No. 11/194,917 entitled "Corrugated Conduit and Method of Expanding to Form a Lined Tubular Member" to Zifferer et al. filed Aug. 1, 2005; available in private Pair.

* cited by examiner

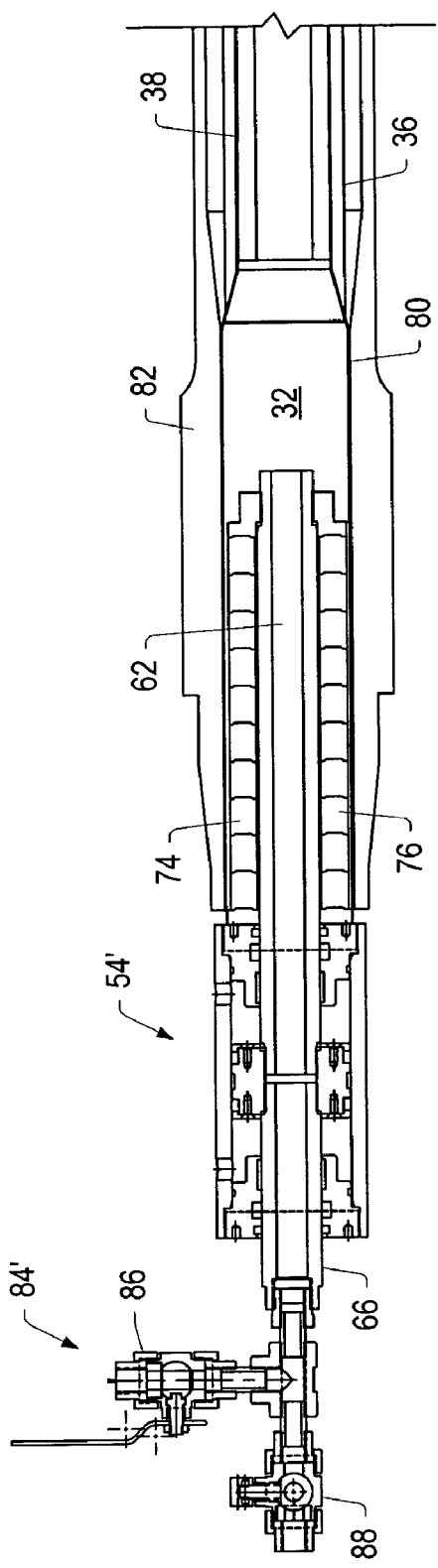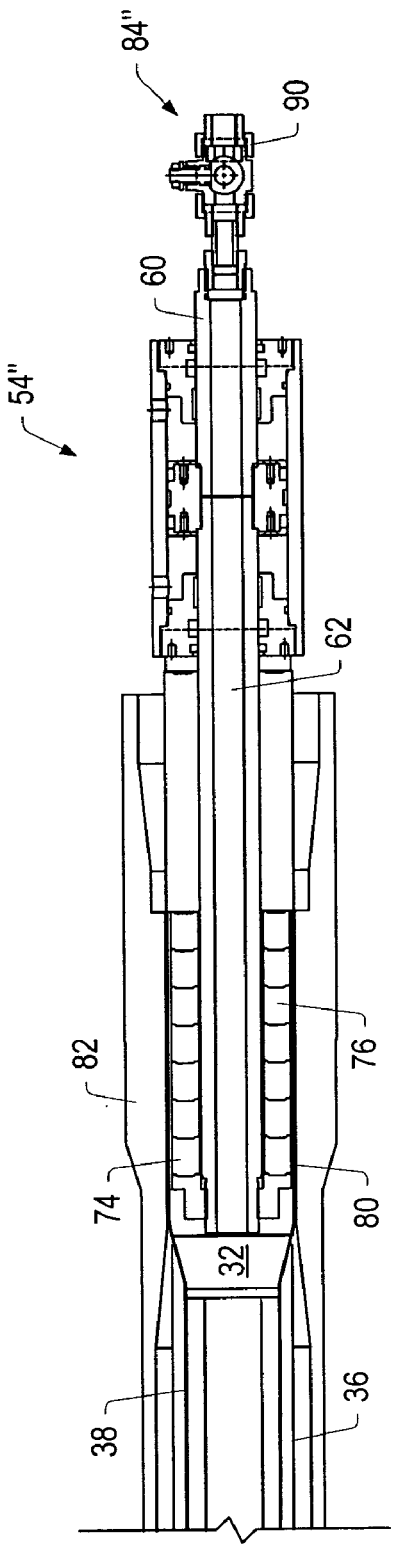
Fig. 9A
Fig. 9B

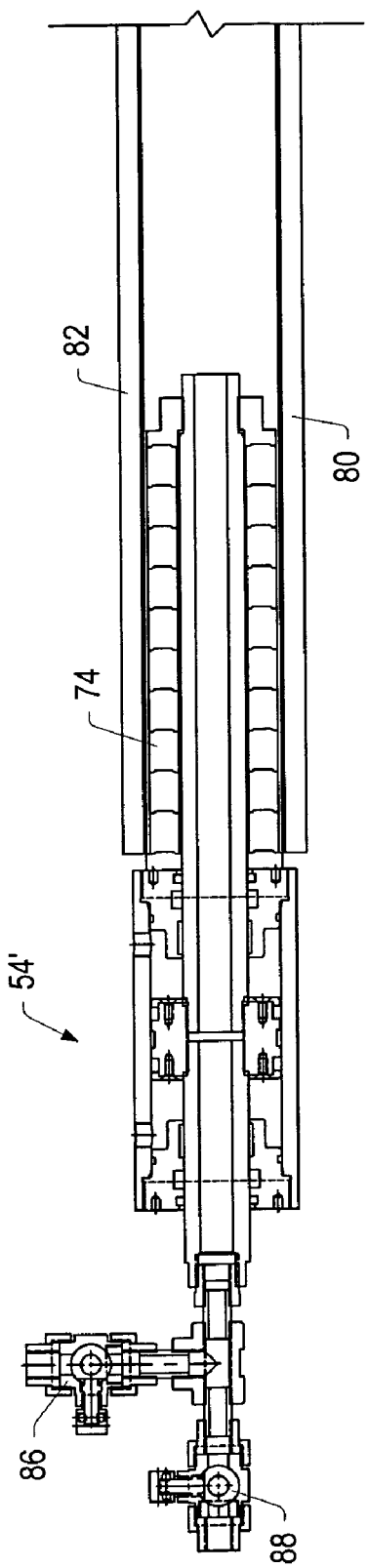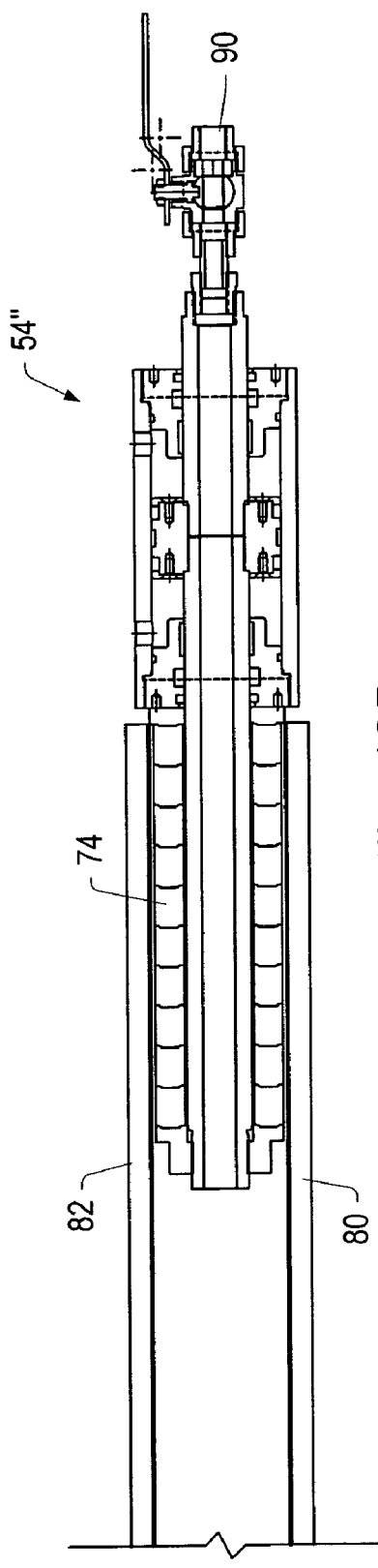
Fig. 12A
Fig. 12B

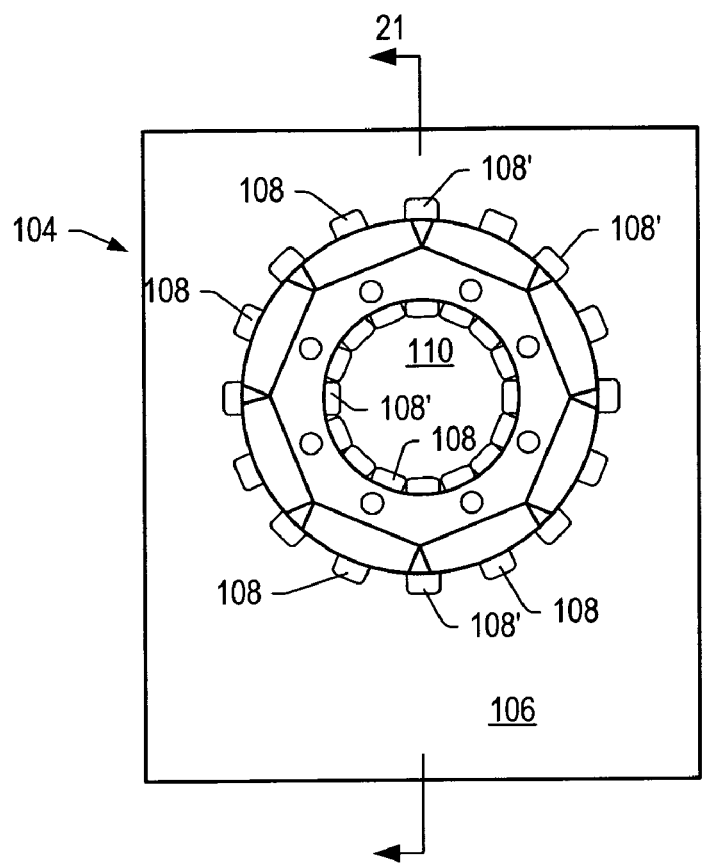
*Fig. 18*
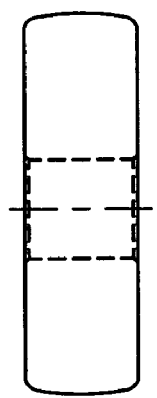 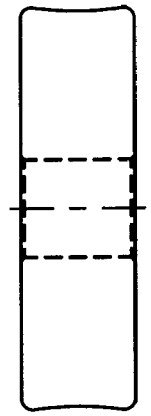
*Fig. 19*  *Fig. 20*

METHOD FOR FORMING A LINED CONDUIT

BACKGROUND

1. Field of the Invention

The present invention generally relates to lined conduits. The present invention generally relates to a lined conduit formed by decorrugating a corrugated liner inside the conduit. The present invention also generally relates to an apparatus and method for forming a lined conduit by decorrugating a corrugated liner after the liner has been placed in the conduit.

2. Description of Related Art

The use of conduits, such as tubes and pipe, is well known. For example, elongated hollow tubes may be used as heat exchange tubes. The use of tubes in heat exchangers is disclosed in various U.S. patents, including U.S. Pat. No. 2,365,688 to Dewey; U.S. Pat. No. 2,342,117 to Brown et al.; U.S. Pat. No. 2,499,901 to Brown; U.S. Pat. No. 2,797,554 to Donovan; and U.S. Pat. No. 4,162,702 to Andersson, all of which are incorporated by reference as if fully set forth herein.

In some applications, such as tube-in-shell type heat exchangers, tubes having a non-uniform outer surface have been proposed. For example, in U.S. Pat. Nos. 5,251,693 and 5,311,661 to Zifferer, both of which are incorporated by reference as if fully set forth herein, a heat exchange tube having a portion that includes corrugations is described. U.S. Pat. No. 4,377,083 to Shepherd; U.S. Pat. No. 4,514,997 to Zifferer; U.S. Pat. No. 2,110,965 to Singer; U.S. Pat. No. 2,378,729 to Schmidt; and U.S. Pat. No. 4,383,429 to Ceccacci, all of which are incorporated by reference as if fully set forth herein, also describe modifications of cross-sectional shape and/or area of conduits. U.S. Pat. No. 5,016,806 to Yapp et al., which is incorporated by reference as if fully set forth herein, describes the use of rollers to impart a desired shape to a tubular member.

Conduits may be formed of many different materials. Some conduits may be made of materials that are relatively soft (e.g., copper or aluminum). Wall thickness of some conduits may be relatively thin. A conduit made of a relatively soft material and/or a conduit having a relatively thin wall thickness may be corrugated using blades to press indentions in the conduit. Some conduits may be made of relative hard materials (e.g., carbon steel, stainless steel, titanium). Some conduits may have relatively a relative large wall thickness. The use of blades to form a corrugated conduit from a relatively hard material and/or from a conduit having a relatively large wall thickness may be difficult.

A pointing device may be used to form a conduit with a reduced diameter end. U.S. Pat. No. 5,311,661 to Zifferer, which is incorporated by reference as if fully set forth herein, describes a pointing device for forming a reduced diameter end portion in a conduit.

Lined conduits may be used in a variety of environments to inhibit corrosion and/or abrasion of a conduit by material flowing through the conduit. U.S. Pat. No. 2,982,360 to Morton, which is incorporated by reference herein, describes providing a metal liner in combination with steel oil and/or gas well tubing such that the steel tubing will not be subject to hydrogen and stress-corrosion cracking. U.S. Pat. No. 6,354,373 to Vercaemer et al., which is incorporated by reference herein, describes an expandable tubing for a well bore hole in which selected length portions are weakened by a slot configuration to obtain predetermined expansion characteristics. U.S. Pat. No. 4,865,127 to Koster, which is incorporated by reference herein, describes a method and apparatus for relining bores, such as oil wells, using multiple layers of spiral wrapped, resilient lining material which expands to form a continuous liner for the bore. U.S. Pat. No. 5,390,742 to Dines et al., which is incorporated by reference herein, describes a specially configured tubular nipple structure that may be coaxially placed in a subterranean well flow conductor, and positioned therein to extend through a subsurface fluid production zone. U.S. Pat. No. 6,923,035 to Zifferer, which is incorporated by reference as if fully set forth herein, describes a method and apparatus for forming a corrugated conduit that may be inserted in a conduit and expanded to form a lined conduit.

U.S. Pat. No. 6,749,026 to Smith et al., which is incorporated by reference herein, describes a method of forming a downhole connection between tubular strings, including the step of crimping the tubular strings together. One of the tubular strings may be expanded outwardly within the other tubular string prior to the crimping step. U.S. Pat. No. 6,722,451 to Saugier, which is incorporated by reference herein, describes a method to deliver an expandable casing string to an uncased borehole coaxially upon a composite coiled tubing drilling string. Once the drilling operation is completed, the casing string is expanded by supplying pressure between the coaxially positioned strings to expand the casing string to the borehole.

SUMMARY

A conduit modifier may be used to form corrugations in a portion of a conduit so that the conduit has a corrugated portion and an uncorrugated portion. In an embodiment, a width of the corrugated portion of the conduit may be larger than a diameter of an uncorrugated portion of the conduit. In an embodiment, a width of the corrugated portion of the conduit may be substantially the same as the diameter of an uncorrugated portion of the conduit. The conduit may be made of a metal, metal alloy, or polymer. In some embodiments, the conduit may be made of a relatively hard metal. For example, the conduit may have a hardness equal or greater than the hardness of carbon steel. In other embodiments, the conduit may be made of a softer material (e.g., copper or aluminum). A conduit to be corrugated may have a diameter from about ½ inch to 12 inches or more. In some embodiments, the conduit may have a relatively large wall thickness. For example, the conduit may be a schedule 40 pipe or heavier gage pipe. In other embodiments, the conduit may have a relatively thin wall thickness.

A corrugated conduit may be used to line a conduit. In some embodiments, a lined conduit includes a first conduit with an inner surface and a liner connected to the inner surface of the first conduit. The liner may include corrugated and decorrugated material. A thickness of the liner before corrugation may at most 50 mil. In some embodiments, a thickness of the liner before corrugation may be at most 40 mil or at most 25 mil. In certain embodiments, a thickness of the liner is less than ¼ of the thickness of the first conduit.

In some embodiments, the liner includes a metal. The first conduit may include carbon steel and the liner may include stainless steel. In certain embodiments, the liner may be hoop compressed against the first conduit such that the liner is coupled to the first conduit. The liner may be electrically and/or physically coupled to the inner surface of the first conduit.

In some embodiments, the liner may be a conduit that has been corrugated, inserted into the first conduit, and then decorrugated. The corrugation may include a plurality of ridges. In some embodiments, the ridges may be longitudinal ridges. In certain embodiments, the ridges may be compressed. The liner may be hydraulically decorrugated inside the first conduit. In certain embodiments, an outer diameter of the liner prior to corrugation is larger than an inner diameter of the first conduit. An outer diameter of the liner after corrugation may be the same or smaller than the outer diameter of the liner conduit prior to corrugation. After decorrugation, the liner may have a substantially smooth inner surface.

In some embodiments, a lined conduit is made by providing a corrugated liner conduit inside a first conduit and decorrugating the corrugated liner conduit while the corrugated liner conduit is inside the first conduit. The corrugated liner conduit may be sealed before the corrugated liner conduit is decorrugated. In some embodiments, the corrugated liner conduit is evacuated before the corrugated liner conduit is decorrugated. Air in the corrugated liner conduit may be evacuated through a passageway in a piston rod of a hydraulic cylinder before the corrugated liner conduit is decorrugated. In certain embodiments, an outer surface of an end portion of the corrugated liner conduit is expanded against an inner surface of an end portion of the first conduit before the corrugated liner is decorrugated.

In some embodiments, decorrugating includes pressurizing the inside of the corrugated liner conduit to expand the corrugated liner conduit against the inner surface of the first conduit. In some embodiments, decorrugating includes pressurizing the inside of the corrugated liner conduit to expand the corrugated liner conduit against the inner surface of the first conduit. The corrugated liner conduit may form a decorrugated liner on the inner surface of the first conduit. In certain embodiments, decorrugating includes evacuating and then hydraulically pressurizing the inside of the corrugated liner conduit to expand the corrugated liner conduit against the inner surface of the first conduit.

In some embodiments, a method of making a lined conduit includes providing a corrugated liner conduit inside a first conduit and coupling an inner surface of a first end portion of the corrugated liner conduit to a first plurality of deformable rings. The first plurality of deformable rings may be compressed to form a seal between the inner surface of the first end portion of the corrugated liner conduit and an outer circumference of the first plurality of deformable rings. In some embodiments, the first plurality of compressible rings may be positioned about an outer circumference of a piston rod. In certain embodiments, the first plurality of compressible rings may be configured to mate along an outer circumference of a piston rod.

In some embodiments, compressing the first plurality of deformable rings includes compressing the first plurality of deformable rings on a reciprocating piston rod. In certain embodiments, compressing the first plurality of deformable rings includes activating a hydraulic cylinder. Activating the hydraulic cylinder may conform an outer surface of the first end portion of the corrugated liner conduit to the inner surface of a first end portion of the first conduit.

In some embodiments, forming the seal between the inner surface of the first end portion of the corrugated liner conduit and an outer circumference of the first plurality of deformable rings includes expanding an inner diameter of the first end portion of the corrugated liner conduit. In certain embodiments, forming the seal between the inner surface of the first end portion of the corrugated liner conduit and an outer circumference of the first plurality of rings includes coupling an outer surface of the first end portion of the corrugated liner conduit to an inner surface of the first end portion of the first conduit.

In some embodiments, the corrugated liner conduit is evacuated. In certain embodiments, the corrugated liner conduit is pressurized while the corrugated liner conduit is inside the first conduit, such that the corrugations of the corrugated liner conduit are expanded to form a decorrugated liner coupled to the inner surface of the first conduit. In certain embodiments, an inner surface of a second end portion of the corrugated liner conduit is coupled to a second plurality of deformable rings. The second plurality of deformable rings may be compressed to form a seal between the inner surface of the second end portion of the corrugated liner conduit and an outer circumference of the second plurality of deformable rings.

Evacuating the corrugated liner conduit may include evacuating the corrugated liner conduit through a passageway in a piston rod. In some embodiments, evacuating the corrugated liner conduit comprises drawing at least a partial vacuum in the corrugated liner conduit. In certain embodiments, pressurizing the corrugated liner conduit includes hydraulically pressurizing the corrugated liner conduit. In some embodiments, the method includes uncoupling the inner surface of the first end portion of the corrugated liner conduit from the first plurality of compressible rings.

In some embodiments, a system to make a lined conduit by expanding a corrugated liner conduit in a first conduit includes a hydraulic expander. The hydraulic expander may include a hydraulic cylinder and a piston rod coupled to the hydraulic cylinder. The piston rod may include a passageway along a length of the piston rod. One or more deformable rings may be positioned around an outer circumference of a first end portion of the piston rod. In some embodiments, a valve assembly is coupled to a second end portion of the piston rod. In certain embodiments, at least one of the deformable rings is configured to be positioned in a first end of the corrugated liner conduit. The hydraulic cylinder may be configured to be positioned proximate a first end of the first conduit. In some embodiments, the system includes an additional hydraulic expander. The additional hydraulic expander may be coupled to an additional valve assembly. In certain embodiments, the passageway along the length of the piston rod is configured to couple the valve assembly to the additional valve assembly.

In some embodiments, the one or more deformable rings include a plurality of deformable rings. In certain embodiments, at least one of the deformable rings includes polyurethane. In some embodiments, the valve assembly includes one or more valves. At least one of the valves may be configured to be coupled to a vacuum source. At least one of the valves may be configured to be coupled to a fluid source. At least one of the valves may be configured to be coupled to a drain.

In some embodiments, operation of the hydraulic cylinder is configured to compress at least one of the deformable rings such that an outer surface of a first end portion of the corrugated liner conduit is expanded to substantially conform to an inner surface of a first end portion of the first conduit. In certain embodiments, operation of the hydraulic cylinder is configured to compress at least one of the deformable rings such that a seal is formed between at least one of the deformable rings and an inner surface of a first end portion of the corrugated liner conduit.

A conduit modifier may be used to form a corrugated liner conduit. In some embodiments, a conduit modifier may process a conduit that has at least one pointed end. A pointed end of a conduit may include a first portion having a first diameter, a tapered portion, and a second portion having a second diameter. The first diameter is smaller than the second diameter. A pointing device may be used to point an end of the conduit. In some embodiments, both ends of a conduit are pointed.

A pointing device may include a die having a frustro-conical surface that ends in an opening having a desired diameter. An end of the conduit may be pressed into the die until the end emerges through the opening. The portion of the conduit pushed through the opening may have a diameter that is smaller than the original diameter of the conduit. The frustro-conical section of the die may form a tapered section in the conduit. The portion of the conduit that passed through the opening of the die and the tapered portion of the conduit may have a larger wall thickness than other portions of the conduit.

A conduit modifier may include a first set of rollers arranged around a central axis of a passageway through the conduit modifier at a selected distance from the central axis of the passageway. The selected distance may allow a first portion of a pointed tube to pass through the passageway without contacting the rollers. The selected distance may be sufficient to allow the rollers to contact a tapered portion of a conduit. The first set of rollers may form a corrugated portion of conduit by forming indentions in the conduit. The rollers may form a series of ridges and grooves in the conduit. In some embodiments, each roller of the first set of rollers may have a convex shape.

In some conduit modifier embodiments, the conduit modifier may include a second set of rollers. The second set of rollers may be staggered relative to the first set of rollers so that the second set of rollers contacts ridges formed by the first set of rollers. The second set of rollers may be arranged around the central axis at a selected distance from the central axis so that the rollers allow passage of a first portion of a conduit through the rollers. The rollers may contact a tapered portion of the conduit. The staggered relation of the second rollers to the first rollers may allow the second rollers to press ridges and grooves formed by the first set of rollers into the conduit. The second set of rollers may allow the formation of a conduit having a corrugated portion with a width that is substantially the same as the diameter of a first portion of the conduit. In some embodiments, each roller of the second set of rollers may have a concave shape.

Rollers may be supported in roller holders. The roller holders may include bearings that allow for rotation of the rollers. The rollers may be made of a material harder than the material of the conduit. The use of bearings and rollers may allow for the formation of corrugations in conduits without the need to have rollers formed of very hard and expensive materials (e.g., tungsten carbide). The use of rollers may allow for the formation of a corrugated conduit in a short period of time.

A method of modifying a conduit may include corrugating a portion of the conduit with a first plurality of rollers in a conduit modifier. Lengthwise ridges formed by corrugating the conduit with the first plurality of rollers may then be at least partially compressed with a second plurality of rollers, such that a distance from a central axis of the conduit to a high point of a ridge is reduced. Reducing the ridges may also move low points of grooves formed in the conduit towards the central axis of the conduit. In some embodiments, a distance from a central axis of the conduit to a high point of a ridge may be substantially the same as a radius of an uncorrugated end portion of the conduit.

Modifying a conduit may include inserting a first end portion of a conduit into a first end of a passageway of a conduit modifier. The conduit modifier may include a first plurality of rollers surrounding a first portion of the passageway and a second plurality of rollers surrounding an adjacent portion of the passageway. Relative motion of the first end portion of the conduit and the conduit modifier may be achieved such that the first plurality of rollers engages the conduit in the first portion of the passageway. As the first plurality of rollers engages an angled or middle portion of the conduit, at least two sets of alternating grooves and ridges may be formed lengthwise along an outer surface of the conduit. The second plurality of rollers may engage the ridges formed by the first plurality of rollers upon continued relative motion of the conduit and the conduit modifier. As the ridges are engaged by rollers in the second plurality of rollers, the ridges, and the grooves between the ridges, may be pushed radially inwards.

A system for modifying a conduit may include a pointing device and a conduit modifier. The pointing device may be used to form at least one pointed or reduced diameter end of a conduit. The conduit modifier may be used to form alternating ridges and grooves lengthwise along an outer surface of a pointed conduit. The conduit modifier may also at least partially compress the ridges so that a distance from a central axis of the conduit to a high point of a ridge is substantially equal to an outer diameter of a pointed end of the conduit.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention will become apparent to those skilled in the art with the benefit of the following detailed description of embodiments and upon reference to the accompanying drawings in which:

FIG. 6 depicts a cross section of a corrugated conduit embodiment taken substantially along line 6-6 of FIG. 5.

FIGS. 9A and 9B depict cross-sectional views of an embodiment of hydraulic expanders coupled to a corrugated liner positioned in a conduit after seals are formed between the hydraulic expanders and the liner and during evacuation of the liner.

FIGS. 12A and 12B depict cross-sectional views of an embodiment of hydraulic expanders coupled to a decorrugated liner in a conduit after seals are broken between the hydraulic expanders and the liner.

FIG. 18 depicts an end view of an embodiment of a conduit modifier having two sets of rollers.

FIG. 19 depicts an embodiment of a roller for a conduit modifier.

FIG. 20 depicts an embodiment of a roller for a conduit modifier.

Figure 1:
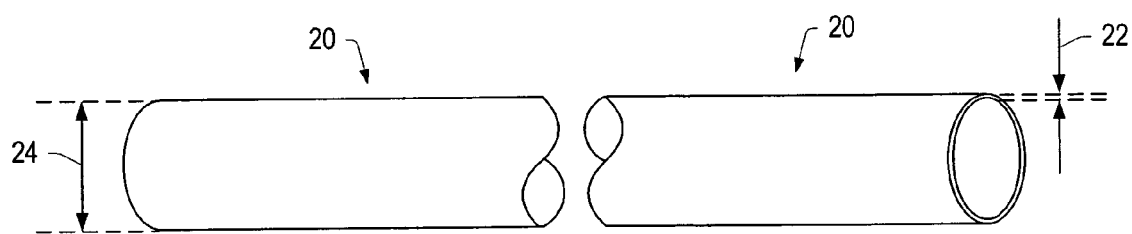
FIG. 1 shows a perspective view of an unmodified conduit.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF EMBODIMENTS

Lined conduits may be used in a variety of applications. A liner for a conduit may be chosen to inhibit corrosion of the conduit. A liner may be made of materials that are substantially inert to the substances intended to flow through the conduit. For example, a liner may be chosen to be substantially nonreactive with chlorine and/or sulfur compounds. Some liners may be chosen to be resistant to acids and/or bases. In some embodiments, a liner may be chosen to enhance flow characteristics of a substance or substances intended to flow through the conduit. In some embodiments, liners may be replaceable wear items. A liner may be replaced after the lined conduit has been in use for a specified time period, or after the liner shows a certain amount of wear. In some embodiments, a used liner may be removed from the conduit prior to insertion of a new liner. In some embodiments, a new liner may be inserted and expanded against a previous liner.

FIG. 1 depicts an embodiment of conduit 20. Conduit 20 may be made of metal, metal alloy, or polymer. In some embodiments, the conduit may be made of a relatively hard metal. For example, conduit 20 may have a hardness equal to or greater than the hardness of carbon steel. In some embodiments, conduit 20 may be formed of stainless steel, carbon steel, titanium, titanium alloys, or combinations thereof. In other embodiments, conduit 20 may be made of a softer material (e.g., copper, copper alloys, aluminum, or aluminum alloys). A length of conduit 20 may be chosen so that a corrugated conduit that is formed from conduit 20 has a desired length. In some embodiments, length of conduit 20 may about 40 feet. Shorter or longer lengths may be used to produce a corrugated conduit of a desired length.

Conduit 20 may have thickness 22. Thickness 22 of conduit 20 may be any desired thickness. In some embodiments, conduit 20 may be schedule 40 or heavier gage pipe. In other embodiments, the conduit may have a relatively thin wall thickness. For example, a conduit may be a 20 gage, 7 gage, or lighter gage pipe. In some embodiments, conduit 20 has a thickness of about 0.050 inches, about 0.035 inches, or less. Conduit 20 may have outer diameter 24. Conduit 20 may have an initial outer diameter in a range from about ½ inch to 12 inches or more. In an embodiment, a conduit has a nominal diameter of about 5 inches.

Figure 2:
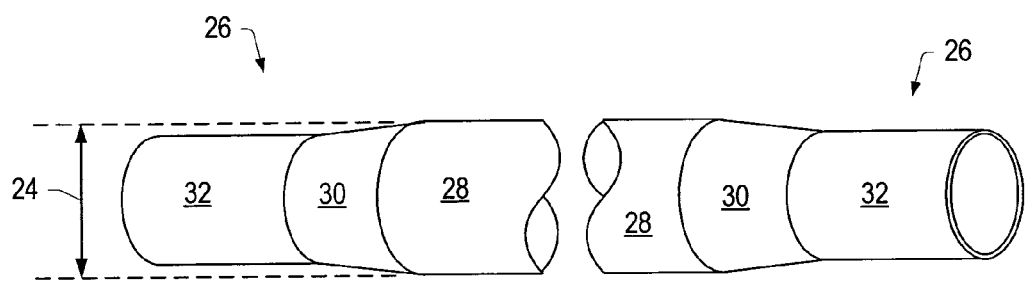
FIG. 2 depicts a conduit with reduced diameter end portions.

A pointing device may be used to transform conduit 20 into a pointed conduit. A pointed conduit refers to a conduit with at least one end that has a smaller diameter than a diameter of a body of the conduit. FIG. 2 depicts a representation of pointed conduit 26 formed from conduit 20 of FIG. 1. Pointed conduit 26 may include body 28, frusto-conical portions 30, and end portions 32. Outer diameter of body 28 may be the same as outer diameter of conduit 20. End portions 32 may have outer diameters that are smaller than the outer diameter of body 28. An outer diameter of a first end portion may be the same or different than an outer diameter of a second end portion. A length of a first end portion may be the same or different than a length of a second end portion. In some embodiments, a pointing device may be used to point only one end of a conduit. In an embodiment, outer diameter of end portions 32 may be about 3-6 inches (e.g., 4.25 inches) while outer diameter of body 28 may have a 4-8 inch (e.g., 5 inch) nominal diameter.

A conduit may be corrugated. A corrugated conduit refers to a conduit having a number of indentions in a body of the conduit that form ridges and grooves in the conduit. Indentions in the conduit may change both an outer surface and an inner surface of the conduit. In some embodiments, grooves and ridges may be formed in a symmetrical pattern about a circumference of a conduit. In some embodiments, grooves and ridges may be formed in an asymmetric pattern about a circumference of a conduit. In some embodiments, grooves and ridges may be formed in a portion of the circumference of a conduit. Grooves and ridges may have shapes including, but not limited to, arcuate, semi-circular, rectangular, trapezoidal, or v-shapes. Certain grooves/ridges may have sizes and/or shapes that are different than the sizes and/or shapes of other grooves/ridges.

As used herein, an "uncorrugated" conduit (or portion of a conduit) refers to a conduit (or portion of the conduit) that has not been corrugated. A "decorrugated" conduit (or portion of a conduit) refers to a conduit (or the portion of the conduit) that has been corrugated and then subsequently expanded to remove at least a portion of the corrugations. In some embodiments, corrugations are still visible in decorrugated conduits. For example, decorrugation may reduce a height of corrugations in a conduit by about 50%, about 75%, or about 90%. In certain embodiments, decorrugation may substantially remove corrugations from a corrugated conduit. That is, an inner and/or outer surface of a decorrugated conduit may appear to be substantially smooth (e.g., uncorrugated).

Figure 3:
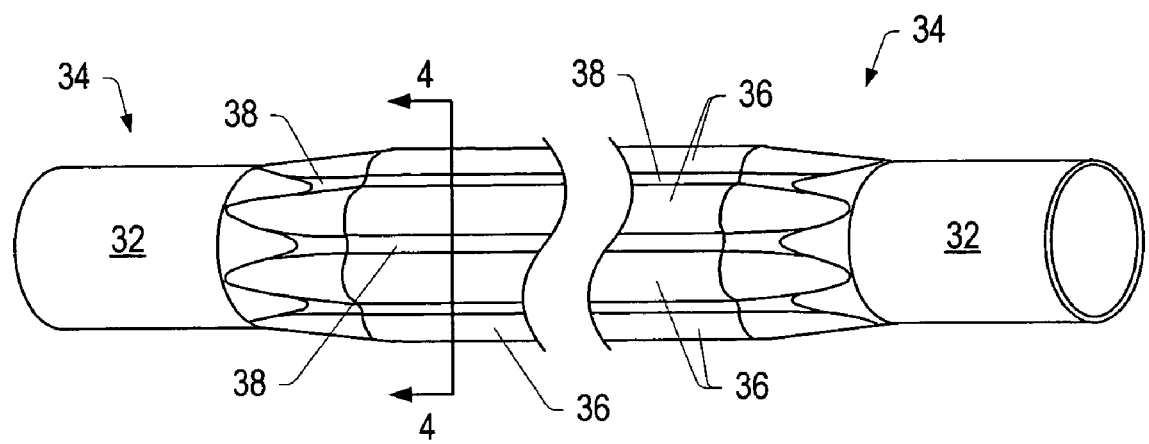
FIG. 3 depicts an embodiment of a corrugated conduit.
Figure 4:
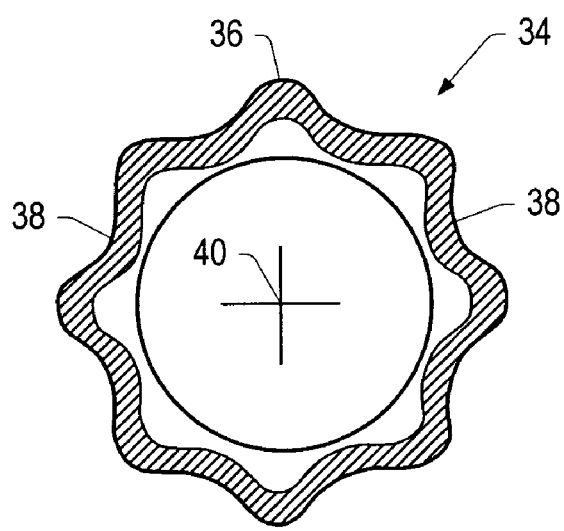
FIG. 4 depicts a cross section of a corrugated conduit embodiment taken substantially along line 4-4 of FIG. 3.

FIG. 3 depicts an embodiment of corrugated conduit 34 formed from a pointed conduit similar to the pointed conduit depicted in FIG. 2. A conduit modifier used to form corrugated conduit 34 may have a single set of rollers. A "roller" is defined as a device that turns around an axis and in doing so can bend at least a portion of another piece, such as conduit. Corrugated conduit 34 may include uncorrugated end portions 32, ridges 36, and grooves 38. A "ridge" is defined as a raised strip on or in a piece, such as a conduit. FIG. 4 depicts a cross-sectional representation of corrugated conduit 34. A distance from center 40 of corrugated conduit 34 to an outermost surface of a ridge of ridges 36 may be substantially the same distance as the radius to the outer surface of body 28 of pointed conduit 26. In some embodiments, a distance from center 40 to a bottom of a groove of grooves 38 on an outer surface of corrugated conduit 34 may be substantially the same as the radius to the outer surface of end portion 32 of pointed conduit 26.

Ridges 36 and grooves 38 may have shapes including, but not limited to, arcuate, semi-circular, rectangular, trapezoidal, or v-shapes. In some embodiments, ridges 36 and grooves 38 may be evenly spaced around the circumference of corrugated conduit 34. In other embodiments, the spacing of grooves and ridges may be asymmetrical. The number of ridges 36 formed in conduit 34 may range from about 3 to about 20 ridges. In some embodiments, the number of ridges formed in a conduit may range from about 6 to about 10. In an embodiment, 8 ridges are formed in a conduit. In certain embodiments, grooves and ridges formed about a circumference of a conduit or a portion of the circumference of the conduit may be longitudinal grooves and ridges formed along the length of the conduit.

Figure 5A:
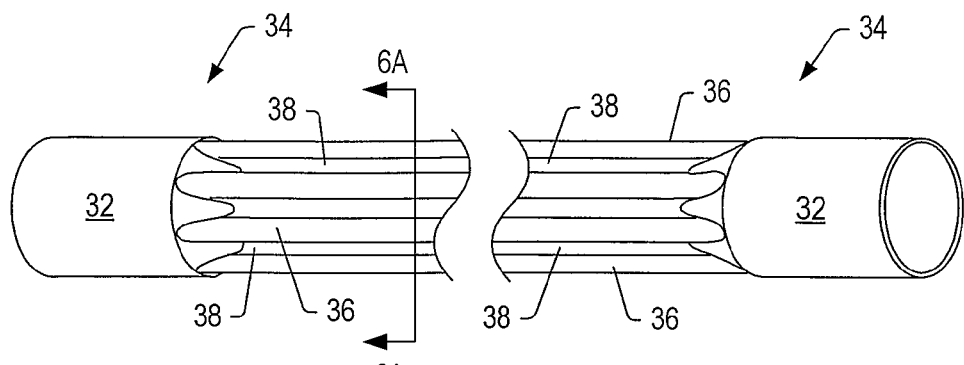
FIG. 5A depicts an embodiment of a corrugated conduit.
Figure 5B:
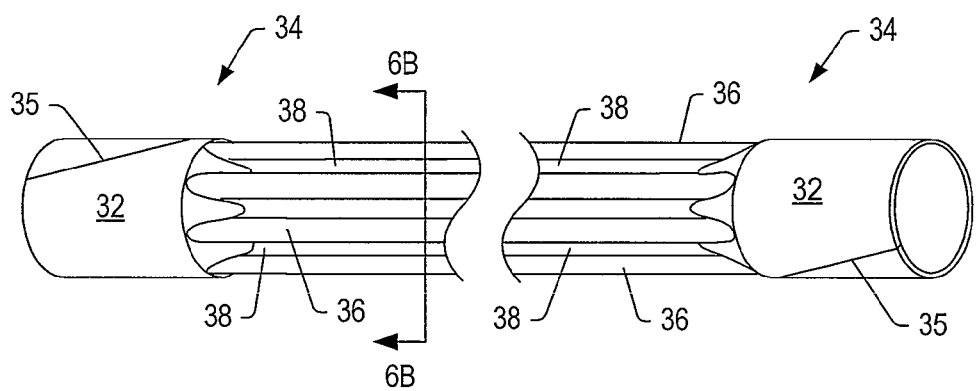
FIG. 5B depicts an embodiment of a corrugated conduit having a spiral weld.
Figure 6A:
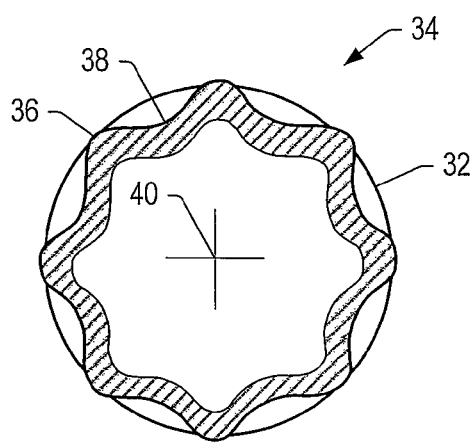
FIG. 6A depicts a cross section of a corrugated conduit embodiment taken substantially along line 6A-6A of FIG. 5A.
Figure 6B:
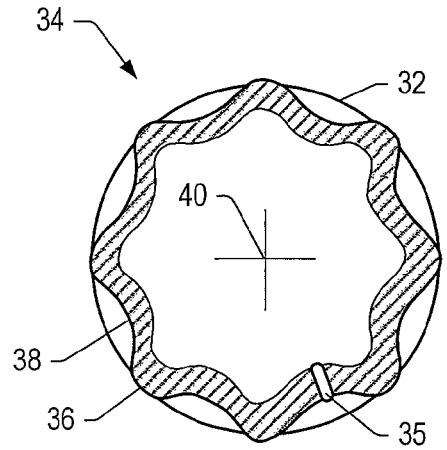
FIG. 6B depicts a cross section of an embodiment of a corrugated conduit having a spiral weld taken substantially along line 6B-6B of FIG. 5B.

FIG. 5A depicts an embodiment of corrugated conduit 34 formed from a pointed conduit similar to the pointed conduit depicted in FIG. 2. FIG. 5B depicts an embodiment of a corrugated conduit having spiral weld 35. A conduit modifier used to form corrugated conduit 34 may have two or more sets of rollers. Corrugated conduit 34 may include uncorrugated end portions 32, ridges 36, and grooves 38. FIG. 6A depicts a cross-sectional representation of corrugated conduit 34 depicted in FIG. 5A. FIG. 6B depicts a cross-sectional representation of a corrugated conduit or liner with spiral weld 35. A distance from center 40 of corrugated conduit 34 to an outermost surface of a ridge of ridges 36 may be substantially the same distance as the radius to the outer surface of end portions 32.

In some embodiments, a corrugated conduit may be formed to serve as an expandable liner. The corrugated liner conduit may be inserted into a tubular member (e.g., conduit, container, pipe, drill stem) to seal the tubular member when the corrugated liner conduit is expanded in the tubular member and/or to protect the tubular member from corrosion and/or abrasion. After inserting the corrugated liner conduit into the tubular member, the corrugated liner conduit may be hydraulically or otherwise expanded against walls (e.g., an inner surface) of the tubular member. For example, conduits (e.g., corrugated liner conduits) may be used to form linings in petroleum drill stems. Drill stems may have threaded ends to accommodate interconnections for deep hole drilling. The threaded ends may have an inner diameter smaller than an inner diameter of a middle portion of the drill stem. A corrugated conduit (e.g., corrugated liner conduit) with ridges that are located a distance from a center of the liner that is substantially the same as a radial distance of an uncorrugated portion of the liner conduit may facilitate insertion of the corrugated conduit into the drill stem. After insertion, the corrugated portion of the conduit may be expanded against the drill stem. In an embodiment, a corrugated conduit of extended length may be formed by coupling end portions of two or more corrugated conduits together. The extended corrugated conduit may be expanded hydraulically within the drill stem.

Figure 7:
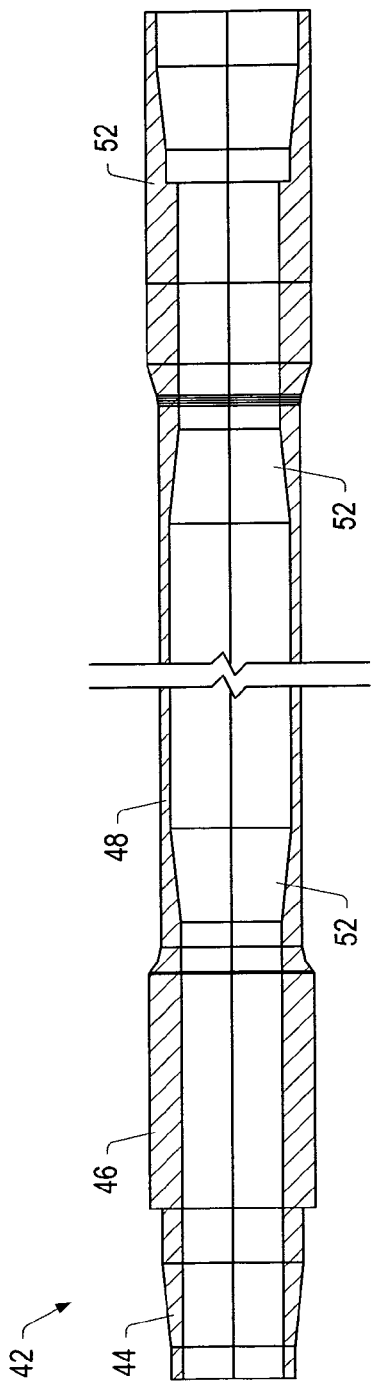
FIG. 7 depicts a cross-sectional view of an embodiment of a drill stem.

FIG. 7 depicts a cross-sectional view of portions of a drill stem. In some embodiments, drill stem 42 may have a length of about 10-100 feet, about 20-90 feet, or about 30-80 feet. In an example, drill stem 42 may have a length of about 40 feet. Drill stem 42 may include drill collar connector 44, drill collar 46, drill pipe 48, and tool joint 50. An inside diameter of drill stem 42 may vary along the length of the drill stem. An inner diameter of at least a portion of drill collar connector 44, drill collar 46, and/or tool joint 50 may be smaller than an inner diameter of drill pipe 48. In some embodiments, as depicted in FIG. 7, drill pipe 48 may include reduced inner diameter portions 52.

In some embodiments, two or more drill stems may be coupled or connected to form a drill stem of a desired length. As used herein, "coupled" pieces may be used operatively with each other, or joined or linked together, with or without one or more intervening members. Pieces that are "removably coupled" may be coupled and then uncoupled without permanently altering the coupled pieces. As used herein, "connected" pieces may be joined or linked together. In some embodiments, pieces that are described as "connected" or "coupled" may be a single piece (e.g., molded as a single piece).

As used below, "liner" generally refers to a corrugated or uncorrugated liner conduit or a decorrugated liner inside a conduit. As used below, "conduit" generally refers to the conduit to be lined or the lined conduit. Lining a conduit (e.g., a tube, a drill stem, a container) may include placing an expandable (e.g., corrugated) liner inside a passageway in the conduit. A maximum outer diameter of the liner may be chosen to be smaller than the minimum inner diameter of the conduit such that the liner may be inserted inside the full length of the conduit. Two or more liners may be connected (e.g., end to end) before insertion of the liner in the conduit. In some embodiments, the liner may be substantially the same length as the conduit. In certain embodiments, a length of the liner is greater than or less than a length of the conduit.

Figure 8:
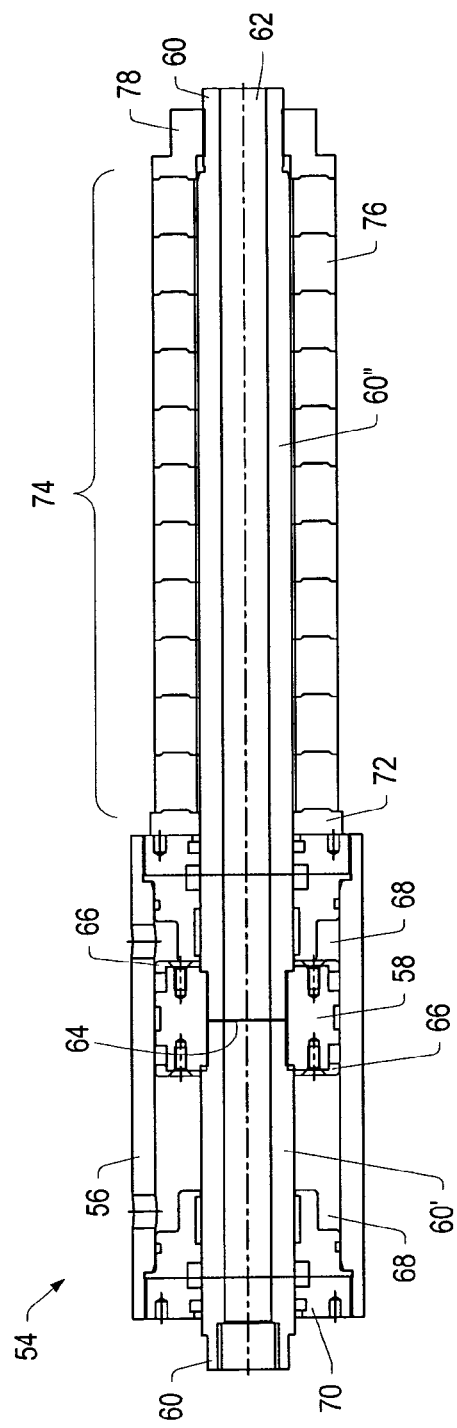
FIG. 8 depicts a cross-sectional view of an embodiment of a hydraulic expander.

FIG. 8 depicts a portion of an apparatus for expanding a liner in a conduit. Hydraulic expander 54 may include hydraulic cylinder 56. Hydraulic cylinder 56 may include piston 58 and piston rod 60. Piston 58 may be made of, for example, H13 tool steel. Piston rod 60 may be made of, for example, 1045 cold rolled steel ("CRS"). In some embodiments, piston rod 60 is a conduit. Piston rod 60 may include passageway 62 along the length of the piston rod. In some embodiments, passageway 62 may have a constant diameter. In certain embodiments, piston rod 60 may include two or more sections threaded together. As depicted in FIG. 8, piston rod 60 includes sections 60', 60". Sections 60', 60" may be connected (e.g., threaded) at joint 64. Piston seal retainers 66 may be positioned proximate piston 58. Piston seal retainers 66 may be made of, for example, 1018 CRS. Piston 58, piston seal retainers 66, and at least a portion of piston rod 60 may be positioned in hydraulic cylinder 56. Openings 68 in hydraulic cylinder 56 may be filled with hydraulic fluid. Hydraulic cylinder 56 may function in a manner generally known in the art to allow reciprocation of piston rod 60.

End cap 70 and seal cap 72 may be coupled to hydraulic cylinder 56. End cap 70 and seal cap 72 may be made of, for example, 1018 CRS. Piston rod 60 may extend through an opening in end cap 70. Compressible portion 74 may be coupled to seal cap 72. Compressible portion 74 may extend along an outer circumference of a portion of piston rod 60. Compressible portion 74 may include material that expands in one direction when the material is under compression in another direction. That is, the compressible material may be deformable. In some embodiments, compressible portion 74 may include material of high durometer hardness. In some embodiments, compressible portion 74 may include one or more rings 76 of various thickness made of materials including, but not limited to, polyurethane and rubber. Rings 76 may include grooves, ridges, and/or other features designed to allow the rings to substantially mate with each other and/or with seal cap 72.

A length of compressible portion 74 may range from about 6-24 inches. In some embodiments, a length of compressible portion 74 may be about 12-16 inches, or about 14 inches. Seal nut 78 may be connected to piston rod 60 proximate an end of the piston rod to promote contact (e.g., mating) of rings 76. That is, seal nut 78 may be connected to piston rod 60 to ensure contact of rings 76 with each other, with seal cap 72, and with the seal nut. In an embodiment, seal nut 78 is made of 1018 CRS.

Hydraulic cylinder 56 may be operated as generally known in the art to reciprocate piston rod 60, such that section 60" of the piston rod is forcefully drawn toward piston 58. With seal nut 78 in a stationary position with respect to hydraulic cylinder 56 and seal cap 72 positioned securely on piston rod 60 proximate the end of the piston rod, operation of hydraulic cylinder 56 periodically decreases a distance between seal cap 72 and seal nut 78, compressing rings 76 on piston rod 60 during each stroke. Compressing rings 76 may cause the rings to expand radially, thus increasing a diameter of compressible portion 74.

With a liner positioned in a conduit, a hydraulic expander may be coupled to each end of the liner and/or the conduit such that a compressible portion from a first hydraulic expander is positioned in the liner at a first end of the liner and a compressible portion from a second hydraulic expander is positioned in the liner at a second end of the liner. FIG. 9A depicts a cross-sectional representation of a first end of liner 80 positioned in a first end of conduit 82. Compressible portion 74 of first hydraulic expander 54' may be positioned in the first end of liner 80. In some embodiments, as depicted in FIGS. 9A and 9B, conduit 82 may be a drill stem. FIG. 9B depicts a cross-sectional representation of a second end of liner 80 positioned in a second end of conduit 82. Compressible portion 74 of second hydraulic expander 54" may be positioned in a second end of liner 80.

In some embodiments, liner 80 is a spiral welded conduit (see for example conduit 34 of FIG. 6B). A spiral welded conduit is formed from a metal strip of a desired width and thickness that is formed into a conduit and welded in a spiral seam along the entire length of the conduit. Using a spiral welded conduit for liner 80 allows liners of various diameters and/or thicknesses to be readily prepared. Spiral welded conduits may advantageously be less likely to pull apart at the weld during expansion than seam welded conduits (e.g., conduits welded in a straight line along a length of the conduit). In addition, stress distribution throughout a spiral welded conduit may be more uniform than stress distribution throughout a seam welded conduit. Furthermore, a spiral welded conduit may be more rigid than a conduit with a longitudinal seam. Spiral welded conduits advantageously achieve a final shape during production and may not require further treatment (e.g., straightening, calibrating, annealing) before corrugation and decorrugation (e.g., expansion).

Liner 80 and conduits to be lined may be made of materials including, but not limited to, metals and metal alloys. Metals used for liner 80 include, but are not limited to, Monel®, Hastalloy®, 316L stainless steel, 409 stainless steel, 439 stainless steel, or other stainless steels grades, nickel, nickel alloys, titanium, titanium alloys, or combinations thereof. A conduit to be lined may be made of, for example, carbon steel. In some embodiments, a wall thickness of liner 80 is at most 0.080 inches (80 mil). For example, a wall thickness of liner 80 may be at most 50 mil, at most 40 mil, or at most 25 mil. In certain embodiments, a wall thickness of liner 80 is about 35 mil before corrugation. In some embodiments, a wall thickness of liner 80 is less than ¼ of a wall thickness of the conduit to be lined.

Relatively thin liners (e.g., with a thickness of at most 0.050 inches or at most 0.025 inches before corrugation) require less material to produce than thicker liners. Thus, relatively thin liners are more economical to produce than thicker liners. Cost savings with relatively thin liners is particularly advantageous with liners made of expensive materials (e.g., specialty steels, nickel, nickel alloys, titanium and/or titanium alloys). Relatively thin liners (and the resulting lined conduits) are also lighter and easier to transport, manipulate, and install than thicker liners (and the resulting lined conduits). For example, a thinner liner may be expanded at a lower pressure than a thicker liner. A tubular member lined with a relatively thin liner may result in a lined conduit with a larger inner diameter area than the same tubular member lined with a thicker liner. A lined conduit with a larger inner diameter may improve properties including, but not limited to, flow rate through the lined conduit and storage capacity of the conduit.

Liner 80 may include corrugations of various designs. For example, liner 80 may be corrugated conduit 34 depicted in FIG. 5. Liner 80 may have, for example, an outer diameter of 4.5 inches before corrugation and a maximum outer diameter of 4.17 inches after corrugation. In some embodiments, a liner has an outer diameter before corrugation that exceeds an inner diameter of the conduit into which the liner is to be expanded. Expanding a liner with an initial outer diameter that exceeds an inner diameter of the conduit into which the liner is to be expanded allows hoop compression of the liner upon expansion, thus allowing physical (e.g., frictional) and/or electrical coupling between the liner and the conduit. In some embodiments, an electrically insulating material may be applied to the liner and/or the conduit before the liner is expanded in the conduit. The electrically insulating material may inhibit electrical coupling between the liner and the conduit, while still allowing the liner to be physically coupled to the conduit. The insulating material may be, but is not limited to paint, a polymer coating, and/or an oxide coating. In some embodiments, the insulating material may inhibit the formation of a galvanic cell between the liner and the conduit that could enhance corrosion of the conduit and/or the liner. In certain embodiments, after decorrugation of liner 80 in a conduit, an outer diameter of the liner may be substantially the same or less than the outer diameter of the liner prior to corrugation.

FIGS. 9A and 9B depict uncorrugated end portions 32, ridges 36, and grooves 38 of liner 80 positioned in conduit 82. Compressible portions 74 of hydraulic expanders 54', 54" may be positioned in uncorrugated end portions 32 of liner 80. Rings 76 of compressible portions 74 may be chosen to fit snugly in uncorrugated end portions 32 of liner 80. A valve assembly may be coupled to an end of piston rod 60 that protrudes from hydraulic cylinder 56 of hydraulic expanders 54', 54". FIG. 9A depicts valve assembly 84'. Valve assembly may include valves 86, 88. FIG. 9B depicts valve assembly 84". Valve assembly 84" may include valve 90. Valves 86, 88, 90 may be, for example, ball valves. In some embodiments, valve 86 is coupled to a vacuum line. Valve 88 may be coupled to a fluid supply line. Valve 90 may be coupled to a return line. In certain embodiments, valve 88 is coupled to a fluid (e.g., water) supply line, and valve 90 is coupled to a drain.

With valve assemblies 84', 84" coupled to piston rods 60, hydraulic expanders 54', 54" may be operated as previously described to alternately compress rings 76 on the piston rod, causing the rings to expand radially, and thus forming a tight fit (e.g., a seal) between compressible portions 74 and uncorrugated end portions 32 of liner 80 at both ends of the liner. Forming a tight fit between compressible portion 74 and uncorrugated end portions 32 of liner 80 may include forming a tight fit between the uncorrugated end portions of the liner and an inner surface of the ends of conduit 82. With compressible portions 74 radially expanded to form seals with liner 80 and uncorrugated end portions 32 of the liner substantially conformed to an inner surface of conduit 82, the corrugated portion of the liner may be expanded. In some embodiments, valve 86 is opened and valves 88, 90 are closed to evacuate liner 80 (e.g., draw at least a partial vacuum) through passageway 62 in piston rod 60. After desired evacuation of liner 80, valve 86 may be closed. Evacuation of liner 80 removes compressible fluid (e.g., gas) from the liner.

Figure 10A:
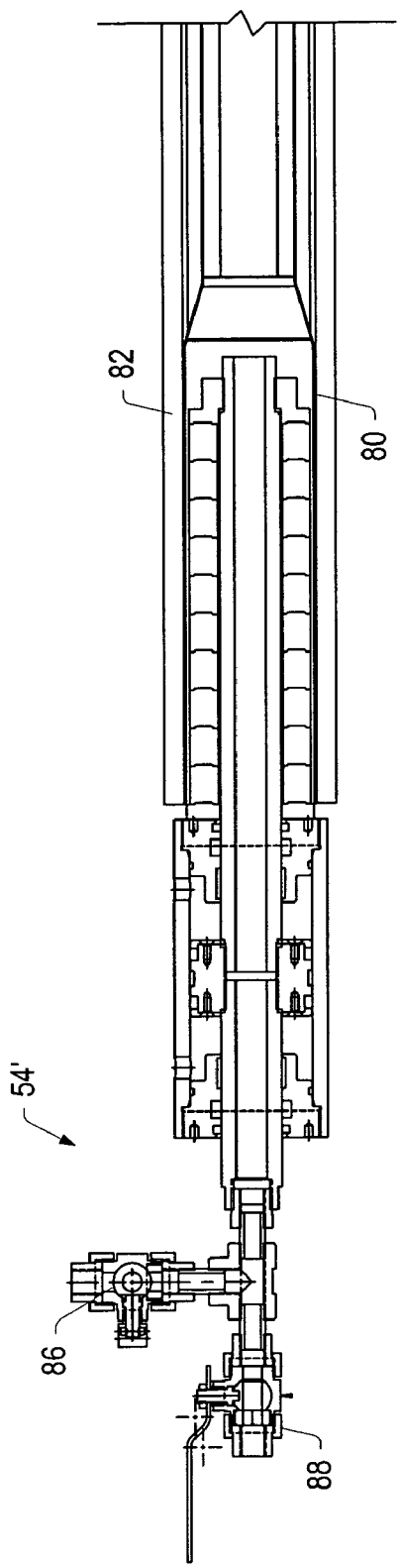
FIGS. 10A and 10B depict cross-sectional views of an embodiment of hydraulic expanders coupled to a corrugated liner positioned in a conduit after evacuation of the liner and before the liner is decorrugated.
Figure 10B:
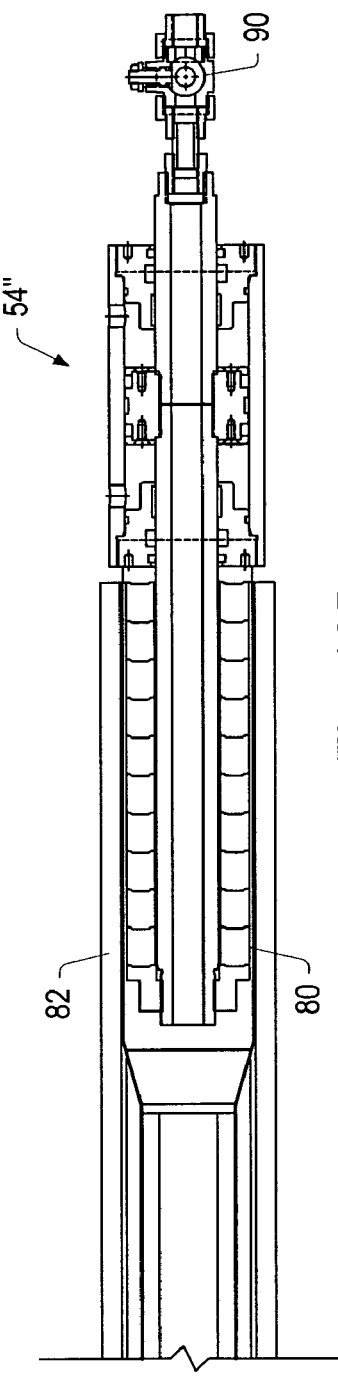

FIGS. 10A and 10B depict hydraulic expanders 54', 54" coupled to liner 80 and conduit 82 with valves 86, 90 closed. With liner 80 evacuated as desired and valves 86, 90 closed, valve 88 may be opened, as depicted in FIG. 10A. Opening valve 88 may allow liner 80 to fill with fluid (e.g., water) from the fluid supply line. In some embodiments, following removal of compressible fluid from liner 80, the liner may be pressurized with substantially incompressible fluid from the fluid supply line to expand (e.g., fully expand) the liner in conduit 82. Pressure of fluid in liner 80 may be monitored during expansion of the liner to limit pressurization such that full expansion of the liner is not accompanied by expansion of the conduit. With thin liners, for example, a pressure of the fluid in the liner may be limited to 500 psi, 600 psi, or 1000 psi. In some embodiments, a pressure of fluid in liner 80 may reach 2500 psi, 3000 psi, or greater.

Figure 11A:
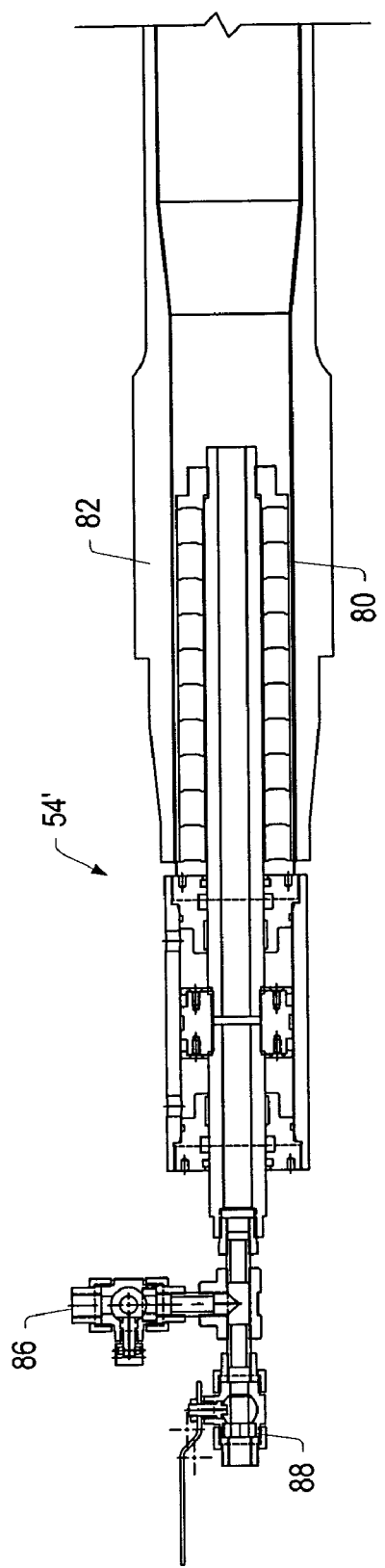
FIGS. 11A and 11B depict cross-sectional views of an embodiment of hydraulic expanders coupled to a liner positioned in a conduit after decorrugation of the liner.
Figure 11B:
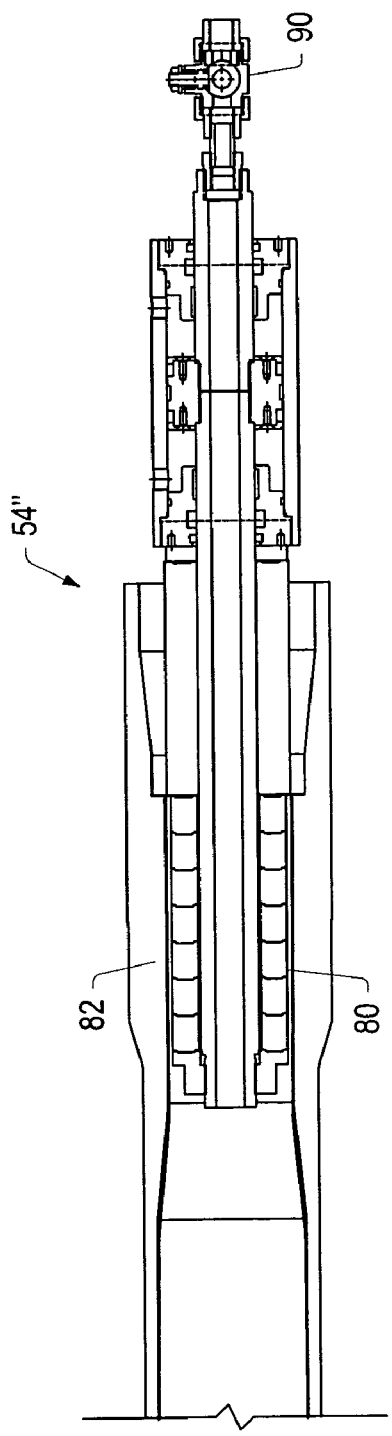

FIGS. 11A and 11B depict hydraulic expanders 54', 54" coupled to liner 80 and conduit 82 with valves 86, 90 closed. With valves 86, 90 closed, liner 80 may be pressurized with fluid entering through valve 88 to substantially conform liner 80 to an inner surface of conduit 82. As depicted in FIGS. 11A and 11B, the ridges and grooves in liner 80 have been fully expanded to conform the liner to the inner surface of conduit 82.

With liner 80 substantially conformed to an inner surface of conduit 82, valve 88 may be closed, as depicted in FIGS. 12A and 12B. With valves 86, 88 closed, valve 90 may be opened to release pressure from liner 80. Compressible portions 74 may be released to break the seal between hydraulic expanders 54', 54" and liner 80, thus allowing the fluid to fully drain from the liner. After breaking the seal between compressible portions 74 and liner 80, hydraulic expanders 54', 54" may be removed from conduit 82 and expanded liner 80. After expansion of liner 80, portions of the liner protruding from conduit 82 may be trimmed as desired. For example, portions of decorrugated liner 80 protruding from conduit 82 may be trimmed to be substantially flush with ends of the conduit.

Figure 13A:
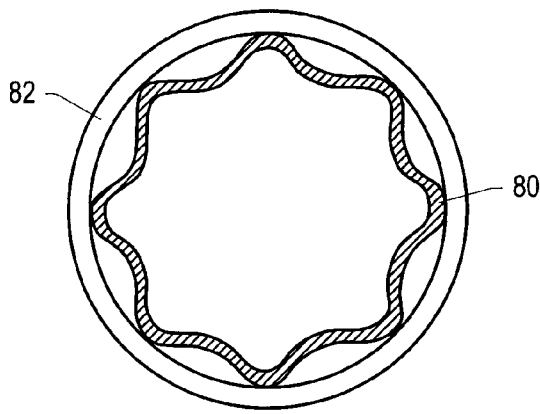
FIG. 13A depicts a cross-sectional view of an embodiment of a corrugated liner positioned in a conduit.
Figure 13B:
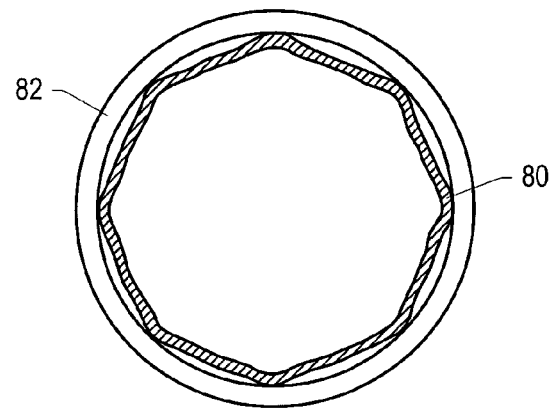
FIG. 13B depicts a cross-sectional view of the embodiment of FIG. 13A after substantially complete decorrugation of the liner in the conduit.
Figure 13C:
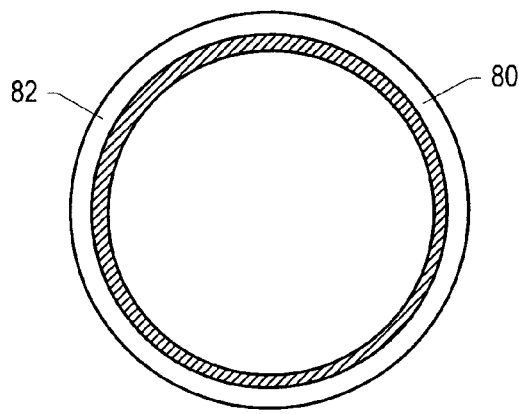
FIG. 13C depicts a cross-sectional view of the embodiment of FIG. 13A after about 50% decorrugation of the liner in the conduit.

In some embodiments, a pressure of the pressurizing fluid used to expand a corrugated liner or a length of time the corrugated liner is pressurized may be controlled to achieve a desired degree of decorrugation of a liner. Various degrees of decorrugation may be useful in applications including, but not limited to, liner replacement. A liner that is significantly decorrugated (e.g., greater than 50% decorrugated, greater than 60% decorrugated, or greater than 70% decorrugated) may be difficult to remove from the conduit because of the frictional fit formed between the conduit and the liner. A liner that has been partially decorrugated may be easier to remove and replace than a liner that has been more completely decorrugated. FIG. 13A depicts a cross-sectional view of an embodiment of corrugated liner 80 positioned in conduit 82 before decorrugation of the liner. FIG. 13C depicts a cross-sectional view of the embodiment of FIG. 13A after about 50% decorrugation of liner 80 in conduit 82. FIG. 13B depicts a cross-sectional view of the embodiment of FIG. 13A after substantially complete decorrugation of liner 80 in conduit 82.

In the following examples, a 2½ inch stroke hydraulic piston was used in each hydraulic expander. The diameter of the hydraulic cylinder was 4 inches. The length of the hydraulic cylinder was 10.5 inches. The seal cap had a thickness of 0.5 inches. The seal included 11 polyurethane washers with a thickness of 1.25 inches each. The washers were placed on the piston rod for a total uncompressed length of 13.75 inches. A thickness of the seal nut was 1.5 inches. The length of the hydraulic expander was about 25 inches, with the piston rod extending slightly beyond the end cap at one end of the hydraulic expander and the seal nut at the other end of the hydraulic expander. Pressure inside the cylinder was 1200 psi, resulting in a force of 15,079 lbs.

In a first example, a spiral welded stainless steel tube liner (4.5 inch diameter, 35 mil thickness) was corrugated and then expanded in a conduit (Schedule 160 pipe, 5 inch outer diameter, 4.323 inch inner diameter) with a maximum fluid pressure inside the liner of 3000 psi. The liner corrugations were approximately 75% expanded.

In a second example, a spiral welded stainless steel tube liner (4.5 inch diameter, 35 mil thickness) was corrugated and then expanded in a conduit (Schedule 160 pipe, 5 inch outer diameter, 4.400 inch bored inner diameter) with a maximum fluid pressure inside the liner of 2850 psi. The liner corrugations were approximately 90% expanded.

In a third example, a spiral welded stainless steel tube liner (4.5 inch diameter, 35 mil thickness) was corrugated and then expanded in a conduit (Schedule 160 pipe, 5 inch outer diameter, 4.450 inch bored inner diameter) with a maximum fluid pressure inside the liner of 2800 psi. The liner corrugations were fully compressed against the inner surface of the conduit.

Figure 14:
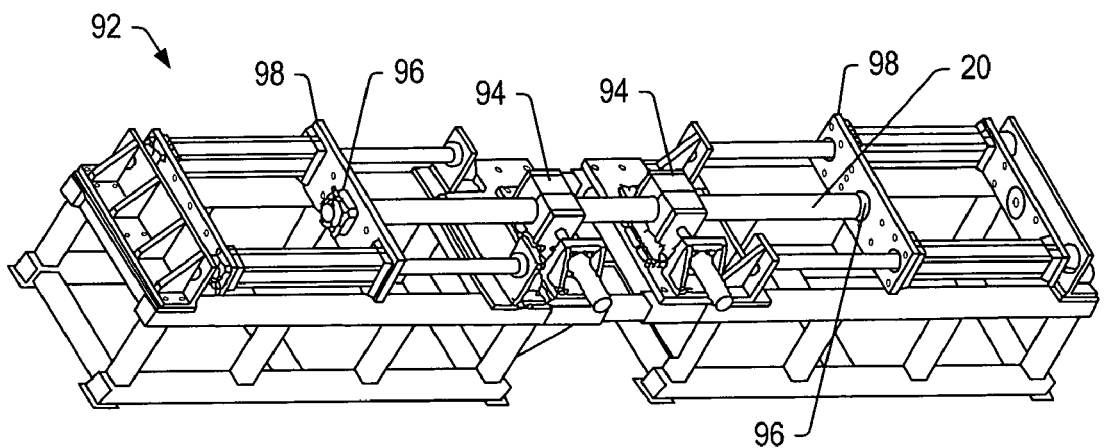
FIG. 14 depicts a perspective view of an embodiment of a pointing device used to reduce an outer diameter of at least one end portion of a conduit.

A corrugated conduit may be formed to fit a tubular member to be lined. Ends of a conduit may be reduced (e.g., pointed) as desired before the conduit is corrugated. For example, ends of a conduit may be reduced to a given diameter for a specified length to correspond to the tubular member to be lined. A pointing device may be used to form pointed conduit 26 (shown in FIG. 2) from conduit 20 (shown in FIG. 1). FIG. 14 depicts an embodiment of pointing device 92 that may be used to form pointed conduit 26. Pointing device 92 may include a pair of clamps 94, point reduction dies 96, and slidable die carriers 98. In an embodiment, pointing device 92 may reduce an outer diameter of an end of conduit 20. In another embodiment, pointing device 92 may simultaneously reduce outer diameters at both ends of conduit 20. In some embodiments, a pointing device may be adjustable to accommodate conduits of differing lengths and diameters.

Conduit 20 may be secured in clamps 94. After conduit 20 is secured in clamps 94, slidable die carriers 98 may be actuated to engage respective point reduction dies 96 with ends of conduit 20. A drive system used to move die carriers 98 and/or conduit 20 may be a hydraulic drive system.

Figure 15:
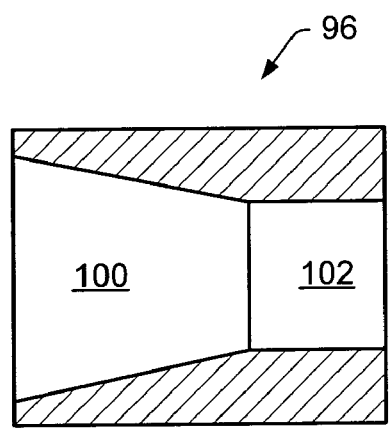
FIG. 15 depicts a cross-sectional view of an embodiment of a point reduction die.

FIG. 15 depicts an embodiment of reduction die 96 of a pointing device. Reduction die 96 may include frustro-conical section 100 and cylindrical section 102. A wide end of frustro-conical section 100 may have a diameter that allows for insertion of a conduit that is to be pointed. As the conduit is forced into reduction die 96, the diameter of the conduit may be reduced to a diameter of cylindrical section 102. After a sufficient length of small diameter section of conduit has been formed, a force used to push the conduit into reduction die 96 may be removed, and the reduction die may be separated from formed pointed conduit 26. Frustro-conical section 100 of reduction die 96 may form frustro-conical portion 30 of pointed conduit 26, as shown in FIG. 2.

Figure 16:
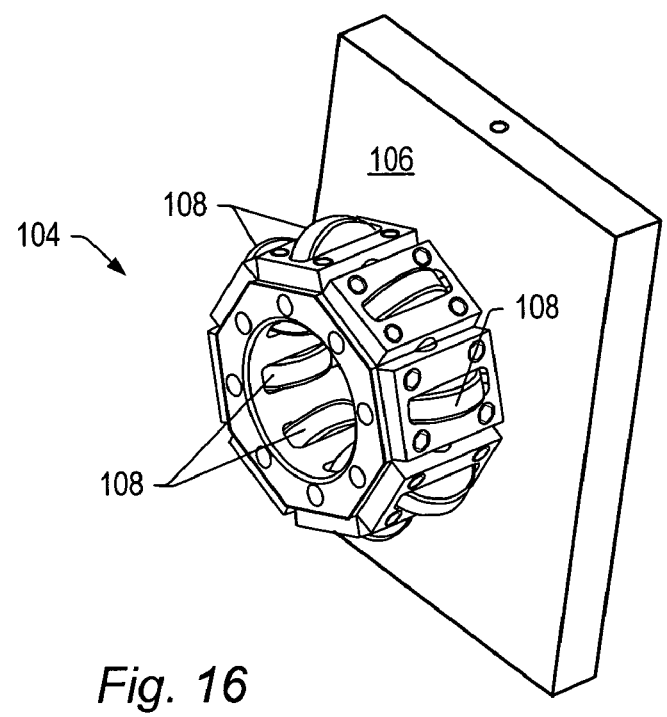
FIG. 16 depicts a perspective view of an embodiment of a conduit modifier having a single set of rollers.

A pointed conduit may be modified by a conduit modifier to form a corrugated conduit. The pointed ends of the conduit may remain uncorrugated. FIG. 16 depicts an embodiment of conduit modifier 104 having a single set of rollers. The embodiment of conduit modifier 104 may be used to form a corrugated conduit such as corrugated conduit 34 depicted in FIG. 3. Conduit modifier may include back plate 106. Back plate 106 may be mounted upon or included as part of a device (e.g., a draw bench). Conduit modifier may include a first set of rollers 108 surrounding a central passage. Rollers 108 may be mounted in roller housings. Rollers 108 may be supported by axles and bearings mounted in the roller housings.

Rollers 108 of conduit modifier 104, such as the conduit modifier depicted in FIG. 16, may be radially spaced around the central passage so that an end portion of a pointed conduit is able to pass through the central passage without touching rollers 108. A frustro-conical portion and a body of the pointed conduit may contact rollers 108 when the pointed conduit is pushed and/or pulled through the central passage. Rollers may indent the conduit and form a series of grooves and ridges in the pointed conduit to produce a corrugated conduit.

Figure 17:
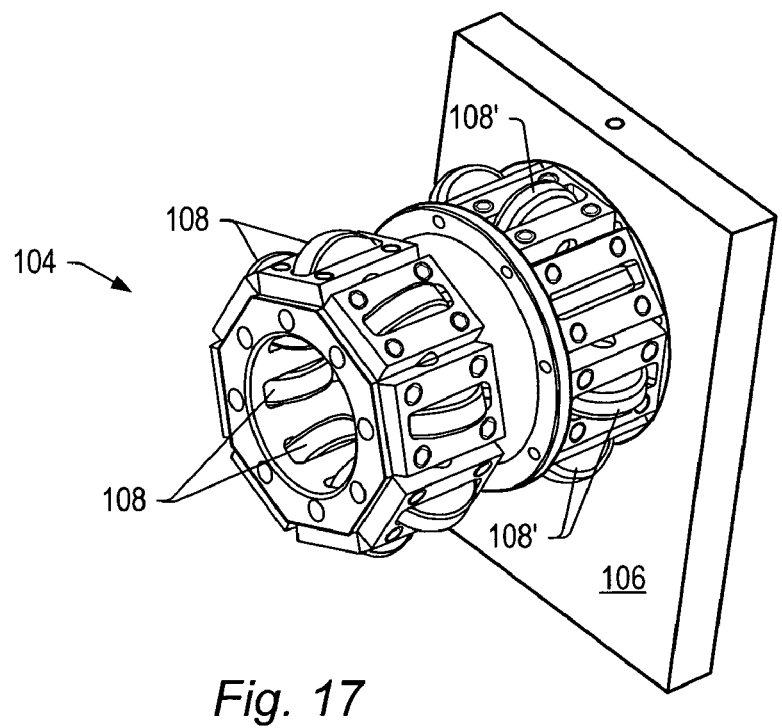
FIG. 17 depicts a perspective view of an embodiment of a conduit modifier having two sets of rollers.

FIG. 17 depicts an embodiment of conduit modifier 104 having two sets of rollers. The embodiment of conduit modifier 104 may be used to form a corrugated conduit such as corrugated conduit 34 depicted in FIG. 5. Rollers 108 and rollers 108' may surround a central passage. Rollers 108, 108' may be mounted in roller housings. Rollers 108, 108' may be supported by axles and bearings mounted in the roller housings.

As shown in FIG. 18, rollers 108 may alternate with rollers 108' around central passage 110. When a pointed conduit is inserted into central passage 110 of conduit modifier 104, rollers 108 may contact a frustro-conical portion and a body of the pointed conduit. Rollers 108 may indent walls of the conduit to form grooves and ridges in the conduit. Ridges formed by rollers 108 may then contact rollers 108'. Rollers 108' may push the ridges towards an axis of central passage 110 (i.e., towards the longitudinal axis of the central passage). Grooves between ridges may also move towards the axis of central passage 110.

FIG. 19 depicts an embodiment of roller 108 of conduit modifier 104 having rollers 108 and rollers 108'. An outer surface of roller 108 may have a convex shape. FIG. 20 depicts an embodiment of roller 108'. An outer surface of roller 108' may have a concave shape. The concave shape may conform better to a shape of a ridge formed by roller 108.

In an embodiment of conduit modifier used to form corrugated conduit from 5 inch nominal diameter pipe, rollers may be about 3 inches in diameter. Widths of the rollers may be chosen to form grooves and ridges of desired sizes. In an embodiment, a width of each roller is about 0.75 inches.

In some embodiments, rollers may not need to be formed of very hard materials to indent conduits. Rollers may be made of material that is harder than the conduits being corrugated. A significant portion of force between the rollers and a conduit being corrugated may be borne by bearings supporting the rollers. Supporting a significant portion of load applied to the rollers on bearings may allow the rollers to be formed of relative inexpensive material and long lasting material (i.e., as compared to tungsten carbide rollers).

In an embodiment, rollers may be designed to produce a desired surface geometry, outer diameter, and/or cross-sectional shape of a conduit. Diameter, face thickness, and shape of the rollers may be chosen to produce desired corrugations. In some embodiments, rollers may include roughened surfaces to form texturing in corrugations formed in a conduit. In some embodiments, texturing may be formed in a corrugated conduit after the conduit is formed. Texturing may be formed in a corrugated conduit by, but is not limited to being formed by, scoring, etching, and/or peening a surface or surfaces of the corrugated conduit. In some embodiments, a corrugated conduit may be chemically and/or mechanically polished to reduce the presence of texturing in surfaces of the conduit.

Figure 21:
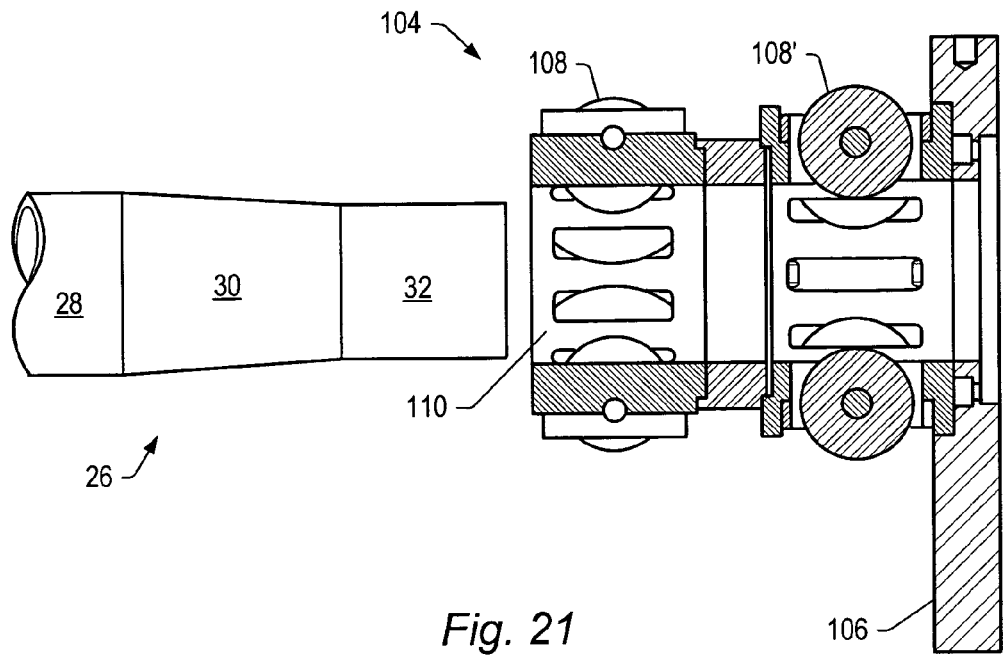
FIG. 21 depicts a cross-sectional representation of a conduit modifier taken substantially along line 21-21 of FIG. 18.

FIG. 21 depicts pointed conduit 26 prior to insertion into conduit modifier 104. Pointed conduit 26 may be formed using pointing device 92 depicted in FIG. 14. Pointed conduit 26 may be moved into central passage 110 of conduit modifier 104. In some embodiments, a portion of the conduit that has passed through conduit modifier 104 may be grasped and a remaining portion of the conduit may be pulled through the conduit modifier.

Figure 22:
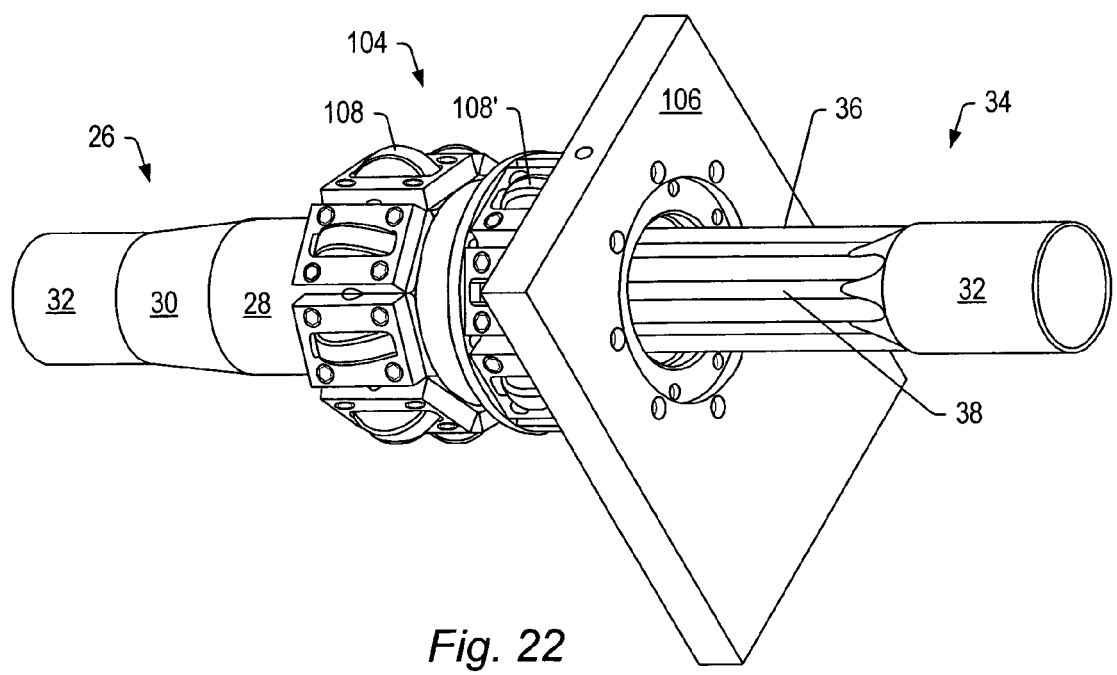
FIG. 22 depicts a perspective view of a conduit modifier during formation of a corrugated conduit.

End portions 32 of pointed conduit 26 may pass through central passage 110 without contacting rollers 108 and rollers 108'. Frustro-conical section 30 and body 28 may contact rollers 108 and rollers 108'. FIG. 22 depicts a conduit modifier during formation of a corrugated conduit. Rollers 108 and rollers 108' of conduit modifier 104 may form indentions in pointed conduit 26 to form corrugated conduit 34. Rollers 108' may push ridges 36 formed by rollers 108 inwards so that a height of the ridges in corrugated conduit 34 from a center axis of the conduit is about the same as the outer radius of uncorrugated end portion 32 of the corrugated conduit.

The apparatus and method described herein may be used advantageously for forming modified conduits quickly and efficiently, without requiring frequent replacement of machine components. Large and/or heavy-duty conduits may be modified to form corrugated conduits. In some embodiments, a distance from a central axis to an outermost portion of a ridge of a corrugation may be substantially the same as a radius from the central axis to an outer diameter of an uncorrugated portion of the conduit.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of making a lined conduit, comprising:
   providing a corrugated liner conduit inside a first conduit;
   evacuating the corrugated liner conduit after providing the corrugated liner conduit to the inside of the first conduit; and
   decorrugating the corrugated liner conduit while the corrugated liner conduit is inside the first conduit.

2. The method of claim 1, wherein evacuating the corrugated liner conduit comprises evacuating the corrugated liner conduit through a passageway in a piston rod of a hydraulic cylinder before decorrugating the corrugated liner conduit.

3. The method of claim 1, wherein evacuating the corrugated liner conduit comprises drawing at least a partial vacuum in the corrugated liner conduit.

4. The method of claim 1, wherein decorrugating comprises pressurizing the inside of the corrugated liner conduit to expand the corrugated liner conduit against an inner surface of the first conduit.

5. The method of claim 1, wherein decorrugating comprises pressurizing the inside of the corrugated liner conduit to expand the corrugated liner conduit against the inner surface of the first conduit such that the corrugations of the corrugated liner conduit are expanded to form a decorrugated liner on the inner surface of the first conduit.

6. The method of claim 1, wherein decorrugating comprises pressurizing the inside of the corrugated liner conduit to expand the corrugated liner conduit against the inner surface of the first conduit such that the corrugations of the corrugated liner conduit are expanded to form a decorrugated liner on the inner surface of the first conduit, and wherein an outer diameter of the decorrugated liner is substantially the same as or smaller than an outer diameter of the corrugated liner conduit before corrugation.

7. The method of claim 1, wherein decorrugating comprises hydraulically decorrugating the liner.

8. A method of making a lined conduit, comprising:
   providing a corrugated liner conduit inside a first conduit;
   evacuating the corrugated liner conduit after providing the corrugated liner conduit to the inside of the first conduit; and
   hydraulically pressurizing the inside of the corrugated liner conduit to expand the corrugated liner conduit against the inner surface of the first conduit.

9. The method of claim 8, further comprising sealing the corrugated liner conduit before evacuating the corrugated liner conduit.

10. The method of claim 8, further comprising compressing an outer surface of end portions of the corrugated liner conduit to an inner surface of end portions of the first conduit before evacuating the corrugated liner conduit.

11. The method of claim 8, wherein evacuating the corrugated liner conduit comprises drawing at least a partial vacuum in the corrugated liner conduit.

12. A method of making a lined conduit, comprising:
    providing a corrugated liner conduit inside a first conduit;
    evacuating the corrugated liner conduit through a passageway in a piston rod of a hydraulic cylinder before decorrugating the corrugated liner conduit; and
    decorrugating the corrugated liner conduit while the corrugated liner conduit is inside the first conduit.

13. The method of claim 12, wherein decorrugating comprises pressurizing the inside of the corrugated liner conduit to expand the corrugated liner conduit against an inner surface of the first conduit.

14. The method of claim 12, wherein decorrugating comprises pressurizing the inside of the corrugated liner conduit to expand the corrugated liner conduit against the inner surface of the first conduit such that the corrugations of the corrugated liner conduit are expanded to form a decorrugated liner on the inner surface of the first conduit.

15. The method of claim 12, wherein decorrugating comprises pressurizing the inside of the corrugated liner conduit to expand the corrugated liner conduit against the inner surface of the first conduit such that the corrugations of the corrugated liner conduit are expanded to form a decorrugated liner on the inner surface of the first conduit, and wherein an outer diameter of the decorrugated liner is substantially the same as or smaller than an outer diameter of the corrugated liner conduit before corrugation.

16. The method of claim 12, wherein decorrugating comprises hydraulically decorrugating the liner.

17. A method of making a lined conduit, comprising:
    providing a corrugated liner conduit inside a first conduit;
    evacuating the corrugated liner conduit; and
    pressurizing the inside of the corrugated liner conduit to expand the corrugated liner conduit against the inner surface of the first conduit such that the corrugations of the corrugated liner conduit are expanded to form a decorrugated liner on the inner surface of the first conduit, and wherein an outer diameter of the decorrugated liner is substantially the same as or smaller than an outer diameter of the corrugated liner conduit before corrugation.

18. The method of claim 17, wherein evacuating the corrugated liner conduit comprises evacuating the corrugated liner conduit through a passageway in a piston rod of a hydraulic cylinder before decorrugating the corrugated liner conduit.

19. The method of claim 17, wherein evacuating the corrugated liner conduit comprises drawing at least a partial vacuum in the corrugated liner conduit.

20. A method of making a lined conduit, comprising:
    providing a corrugated liner conduit inside a first conduit;
    sealing at least a portion of the corrugated liner conduit;
    evacuating the corrugated liner conduit; and
    hydraulically pressurizing the inside of the corrugated liner conduit to expand the corrugated liner conduit against the inner surface of the first conduit.

21. The method of claim 20, wherein evacuating the corrugated liner conduit comprises evacuating the corrugated liner conduit through a passageway in a piston rod of a hydraulic cylinder before decorrugating the corrugated liner conduit.

22. The method of claim 20, wherein evacuating the corrugated liner conduit comprises drawing at least a partial vacuum in the corrugated liner conduit.

23. The method of claim 20, further comprising compressing an outer surface of end portions of the corrugated liner conduit to an inner surface of end portions of the first conduit before evacuating the corrugated liner conduit.

24. The method of claim 20, wherein expanding the corrugated liner conduit comprises pressurizing the inside of the corrugated liner conduit to expand the corrugated liner conduit against the inner surface of the first conduit such that the corrugations of the corrugated liner conduit are expanded to form a decorrugated liner on the inner surface of the first conduit.

25. The method of claim 20, wherein expanding the corrugated liner conduit comprises pressurizing the inside of the corrugated liner conduit to expand the corrugated liner conduit against the inner surface of the first conduit such that the corrugations of the corrugated liner conduit are expanded to form a decorrugated liner on the inner surface of the first conduit, and wherein an outer diameter of the decorrugated liner is substantially the same as or smaller than an outer diameter of the corrugated liner conduit before corrugation.

26. A method of making a lined conduit, comprising:
providing a corrugated liner conduit inside a first conduit;
compressing an outer surface of end portions of the corrugated liner conduit to an inner surface of end portions of the first conduit evacuating the corrugated liner conduit after compressing the outer surface of end portion of the corrugated liner conduit to an inner surface of end portion of the first conduit; and hydraulically pressurizing the inside of the corrugated liner conduit to expand the corrugated liner conduit against the inner surface of the first conduit.

27. The method of claim 26, further comprising sealing the corrugated liner conduit before evacuating the corrugated liner conduit.

28. The method of claim 26, wherein evacuating the corrugated liner conduit comprises drawing at least a partial vacuum in the corrugated liner conduit.

* * * * *